US012355197B2

(12) United States Patent
Manley et al.

(10) Patent No.: US 12,355,197 B2
(45) Date of Patent: Jul. 8, 2025

(54) EAR-WORN HEARING DEVICE WITH ELECTRICAL CONNECTOR

(71) Applicant: KNOWLES ELECTRONICS, LLC, Itasca, IL (US)

(72) Inventors: Matthew Manley, Crystal Lake, IL (US); Christopher Monti, Elgin, IL (US); Charles King, Oak Park, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 300 days.

(21) Appl. No.: 18/148,213

(22) Filed: Dec. 29, 2022

(65) Prior Publication Data

US 2024/0222917 A1 Jul. 4, 2024

(51) Int. Cl.

| | |
|---|---|
| ***H04R 25/00*** | (2006.01) |
| ***H01R 12/53*** | (2011.01) |
| ***H01R 13/502*** | (2006.01) |
| ***H01R 13/66*** | (2006.01) |
| ***H01R 24/62*** | (2011.01) |
| *H01R 13/26* | (2006.01) |
| *H01R 105/00* | (2006.01) |

(52) U.S. Cl.

CPC ............. *H01R 24/62* (2013.01); *H01R 12/53* (2013.01); *H01R 13/502* (2013.01); *H01R 13/6616* (2013.01); *H04R 25/604* (2013.01); *H04R 25/609* (2019.05); *H01R 13/26* (2013.01); *H01R 2105/00* (2013.01); *H04R 2225/0216* (2019.05); *H04R 2225/57* (2019.05); *H04R 2460/11* (2013.01)

(58) Field of Classification Search

CPC ...... H04R 2225/021; H04R 2225/0216; H04R 2225/57; H04R 2420/09; H04R 2460/11; H04R 25/604; H04R 25/607; H04R 25/609; H01R 12/53; H01R 13/26; H01R 13/502; H01R 13/6616; H01R 13/6658; H01R 13/70; H01R 2105/00; H01R 24/62

USPC .......................................................... 381/324

See application file for complete search history.

(56) References Cited

U.S. PATENT DOCUMENTS 8,123,547 B2 2/2012 Miller et al.
9,485,594 B2 11/2016 Grossman et al.
(Continued)

FOREIGN PATENT DOCUMENTS

DE 4109306 C1 * 7/1992
DE 4233813 C1 * 11/1993 ........... H04R 25/502
(Continued)

OTHER PUBLICATIONS

Manley et al., U.S. Appl. No. 62/160,330, entitled, "Overmolded Connector And Method Of Manufacturing The Same", 11 pages, filed May 12, 2015.
(Continued)

*Primary Examiner* — Phylesha Dabney

(57) ABSTRACT

An ear-worn hearing device component is disclosed and includes an electrical connector a housing and multiple connector contacts integrated with a contact carrier. A portion of the contact carrier and connector contacts protrudes from the housing and each connector contact is connected to a corresponding contact of a circuit board located in a cavity of the housing. Wires of an electrical cable mechanically coupled to the electrical connector are connected to the connector contacts via the circuit board.

20 Claims, 5 Drawing Sheets

(56) References Cited

U.S. PATENT DOCUMENTS

| | | | |
|---|---|---|---|
| 11,115,744 | B2 | 9/2021 | Varanda et al. |
| 11,665,489 | B2 | 5/2023 | Laursen et al. |
| 2011/0151706 | A1 | 6/2011 | Miller et al. |
| 2014/0112516 | A1 | 4/2014 | Jiles |
| 2016/0044428 | A1 | 2/2016 | Grossman et al. |
| 2017/0238104 | A1 | 8/2017 | Sanecki et al. |
| 2019/0306606 | A1 | 10/2019 | Varanda et al. |
| 2022/0095064 | A1 | 3/2022 | Laursen et al. |

FOREIGN PATENT DOCUMENTS

| | | | | |
|---|---|---|---|---|
| EP | 2456235 | A1 | 5/2012 | |
| EP | 2456235 | B1 | 9/2015 | |
| EP | 3537731 | A1 * | 9/2019 | ........... H04R 25/305 |

OTHER PUBLICATIONS

Warren et al., U.S. Appl. No. 62/047,093, entitled, "Coil Connector Utilizing Skeining Connection", 10 pages, filed Sep. 8, 2014.
Warren et al., U.S. Appl. No. 62/047,094, entitled, "Coil Connector Using Pig-Tail Connection", 10 pages, filed Sep. 8, 2014.
Warren et al., U.S. Appl. No. 62/047,098, entitled, "Coil Connection Using Circuit Board", 10 pages, filed Sep. 8, 2014.

* cited by examiner

EAR-WORN HEARING DEVICE WITH ELECTRICAL CONNECTOR

FIELD OF THE DISCLOSURE

The present disclosure relates generally to hearing devices and more particularly to ear-worn hearing device components interconnected by an electrical cable assembly comprising an electrical cable and a connector, and connectors for such cable assemblies.

BACKGROUND

Some ear-worn hearing devices comprise multiple components interconnected by an electrical cable including an electrical connector. One such hearing device is a receiver-in-canal (RIC) type behind-the-ear (BTE) hearing aid comprising a BTE unit worn against the backside of a user's ear (pinna) and a RIC unit configured for at least partial insertion in the user's ear canal. The BTE unit contains one or more microphones, electrical circuits and batteries for converting sensed environmental sounds into amplified electrical audio signals. The RIC unit includes a balanced armature receiver (also referred to herein as a "receiver") for converting the electrical audio signals to sound. In some hearing devices, the receiver is contained within a housing. Other RIC units do not include a housing. One end of the electrical cable is coupled to the receiver and another end of the electrical cable includes a connector releasably connected to the BTE unit for transmission of electrical audio signals from the BTE unit to the RIC unit. The electrical cable generally comprises multiple litz wires protected by an insulated layer and the electrical cable has a fixed shape that extends between the user's pinna and ear canal. The electrical connector can also comprise one or more electrical components that can complicate assembly and increase cost. Thus there is an ongoing need for improvements in ear-worn hearing devices comprising components interconnected by electrical connectors.

BRIEF DESCRIPTION OF THE DRAWINGS

The objects, features and advantages of the present disclosure will become more fully apparent from the following detailed description and the appended claims considered in conjunction with the accompanying drawings. The drawings depict only representative embodiments and are therefore not considered to limit the scope of the disclosure.

Those of ordinary skill in the art will appreciate that the figures are illustrated for simplicity and clarity and therefore may not be drawn to scale and may not include well-known features, that the order of occurrence of actions or steps may be different than the order described or that some or all of the actions or steps may be performed concurrently unless specified otherwise, and that the terms and expressions used herein have meanings understood by those of ordinary skill in the art except where different meanings are attributed to them herein.

DETAILED DESCRIPTION

Figure 1:
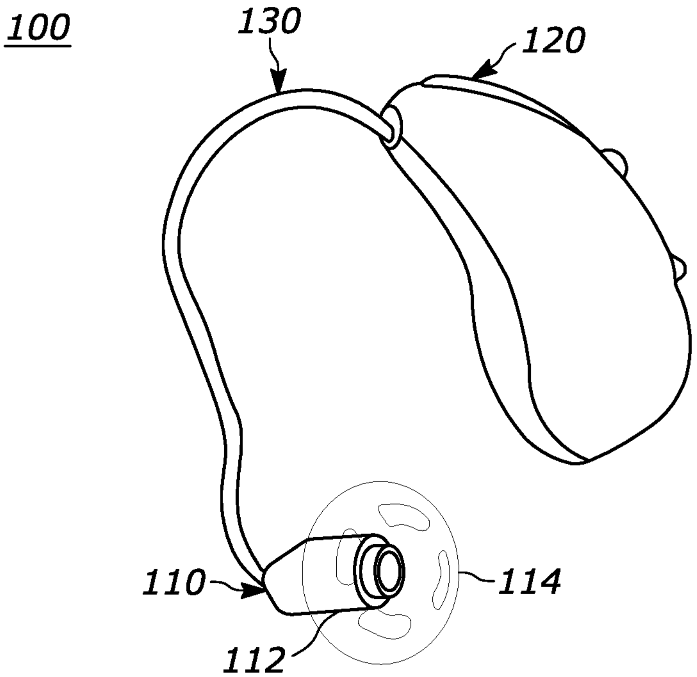
FIG. 1 is a representative ear-worn hearing device comprising multiple components connected by an electrical cable assembly including an electrical connector.

The disclosure relates generally to hearing devices and more particularly to ear-worn hearing device components connect to, or interconnected by, an electrical cable assembly comprising an electrical connector. The disclosure also relates to electrical cable assemblies and connectors for such cable assemblies. FIG. 1 is a representative ear-worn hearing device 100 generally comprising a receiver-in-canal (RIC) unit 110 comprising an acoustic receiver 112 having a sound port coupled to a resilient ear dome 114 configured for insertion at least partially in a user's ear canal. In other RIC units, the acoustic receiver is disposed in a housing (not shown) and the ear dome is connected to a nozzle on the housing. Such a housing can include one or more microphones and physiological sensors, among other circuits and sensors. The representative hearing device also comprises a behind-the-ear (BTE) unit 120 unit configured for wear on a backside of a user's ear. The BTE unit generally comprises one or more microphones, an audio signal processor, electrical circuits and batteries. The BTE unit can optionally include a wireless transceiver, among other electrical circuits and sensors. In FIG. 1, an electrical cable assembly 130 mechanically and electrically interconnects RIC and BTE units. The electrical cable assemblies and connectors therefor described herein can also be used to interconnect components of other hearing devices, referred to herein as a base unit and an in-ear unit. More generally, the cable assembly connectors described herein can be connected to electronic devices other than hearing devices, including but not limited to smartphones, laptop computers among electronic devices and equipment.

Figure 3:
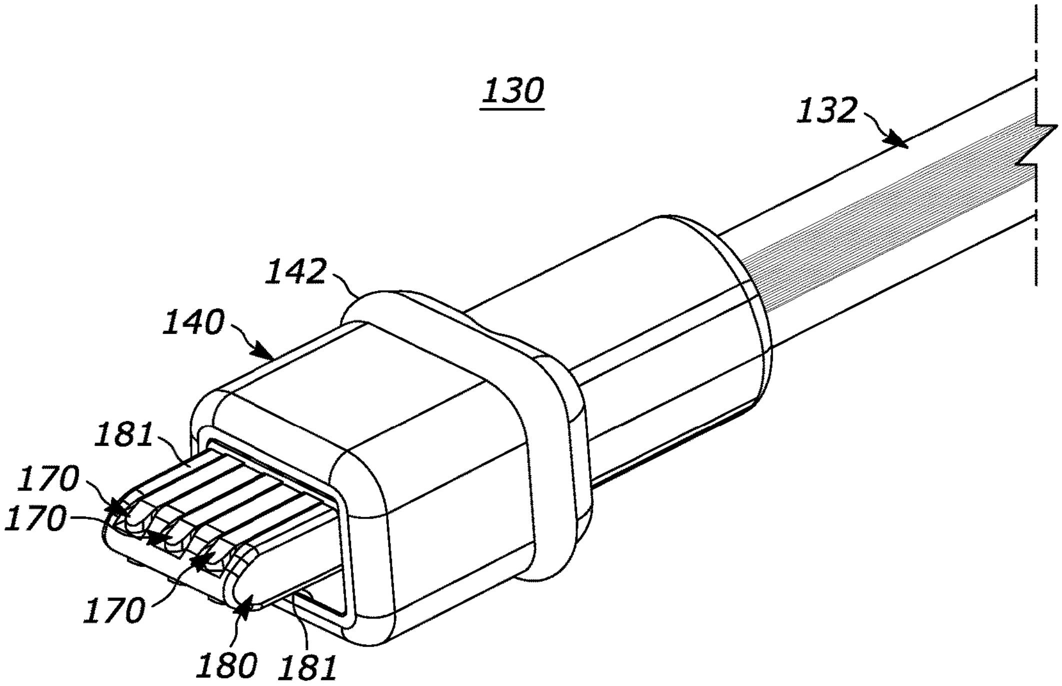
FIG. 3 is a representative electrical connector.

In hearing device implementations, the cable assembly can have a fixed shape configured to extend between the BTE and RIC units. In other implementations, the cable assembly can be flexible or have some other fixed shape configuration. In FIG. 3, the cable assembly generally comprises an electrical cable 132 and a connector 140 fastened to at least one end of the electrical cable. The electrical cable comprises multiple wires for signal transmission. In hearing device implementations, the cable assembly transmits processed audio signals from the BTE unit to the RIC unit. The cable assembly can also transmit microphone, sensor and other signals from the RIC unit to the BTE unit for processing or transmission to a remote device, like a smartphone. In hearing devices and other applications, each wire of the electrical cable can be a multi-strand litz wire. More generally the cable assembly can comprise other types of wire for transmitting signals to or from the electronic device to which it is connected.

In some hearing devices, one end of the electrical cable is permanently mechanically and electrically affixed to an in-ear unit and another end of the cable assembly is releasably connectable to a base unit by an electrical connector. The in-ear unit combined with a cable assembly can have different sizes and power levels to accommodate variations in user anatomy, and may also have different functional features. The releasable electrical connector of the cable assembly permits interchangeable use of different in-ear units and cable assembly combinations with a common base unit. The electrical cable assembly can also include a connector for connecting to the in-ear unit or other electrical device.

Figure 2:
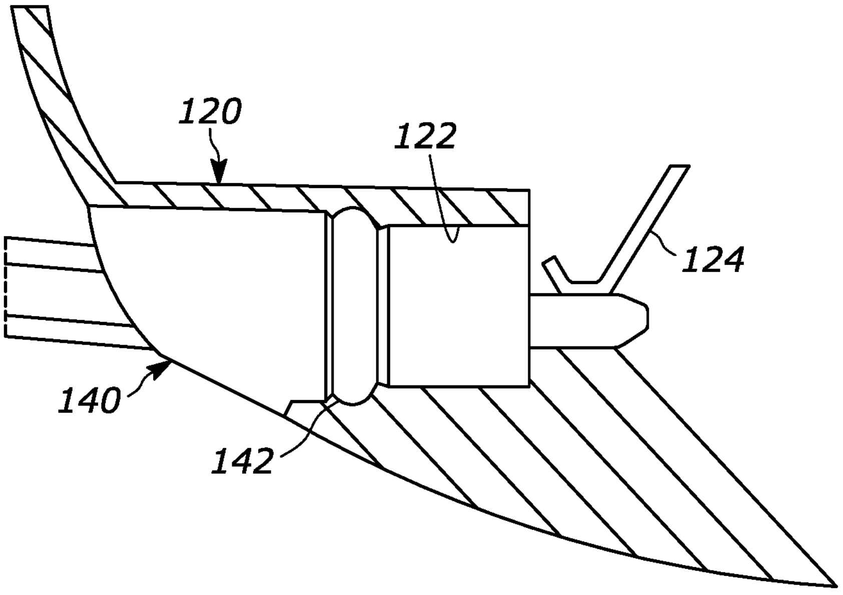
FIG. 2 is a partial view of an electrical connector connected to a base component.

FIG. 2 is a partial sectional view of an electrical connector 140 mechanically and electrically connected to a complementary connector on a base unit or other electronic device 120 comprising a socket 122 for receiving a housing 160 of the connector. One or more spring contacts or other electrical contacts 124 of the electronic device 120 are configured to contact corresponding connector contacts of the electrical connector described further herein. The other end of the electrical cable can also include a connector for connecting to some other hearing device component, for example the RIC unit 110 of FIG. 1. In FIGS. 2-3, the electrical connector 140 comprises a ring-type seal 142 or other type of gasket. In FIG. 2, the seal 142 provides a moisture and debris barrier between the connector 140 and the socket 122. FIG. 2 is more generally representative of other electronic devices having a complementary connector to which the cable assembly can be mechanically and electrically connected. The electrical connector can be retained in the socket by interlocking mechanical feature (e.g., detents, latches, etc.) and by frictional engagement with the seal.

The electrical connector generally comprises a housing and multiple connector contacts integrated with a contact carrier. The contact carrier is partially disposed in a cavity of the housing and covers an open-end of the cavity. A first portion of the contact carrier and a first end portion of each connector contact protrude from the housing. A second portion of the contact carrier and a second end portion of each connector contact are disposed in the cavity of the housing. The contact carrier covers the open-end of the cavity and orients the first portion of the contact carrier and the connector contacts relative to the housing.

Figure 4:
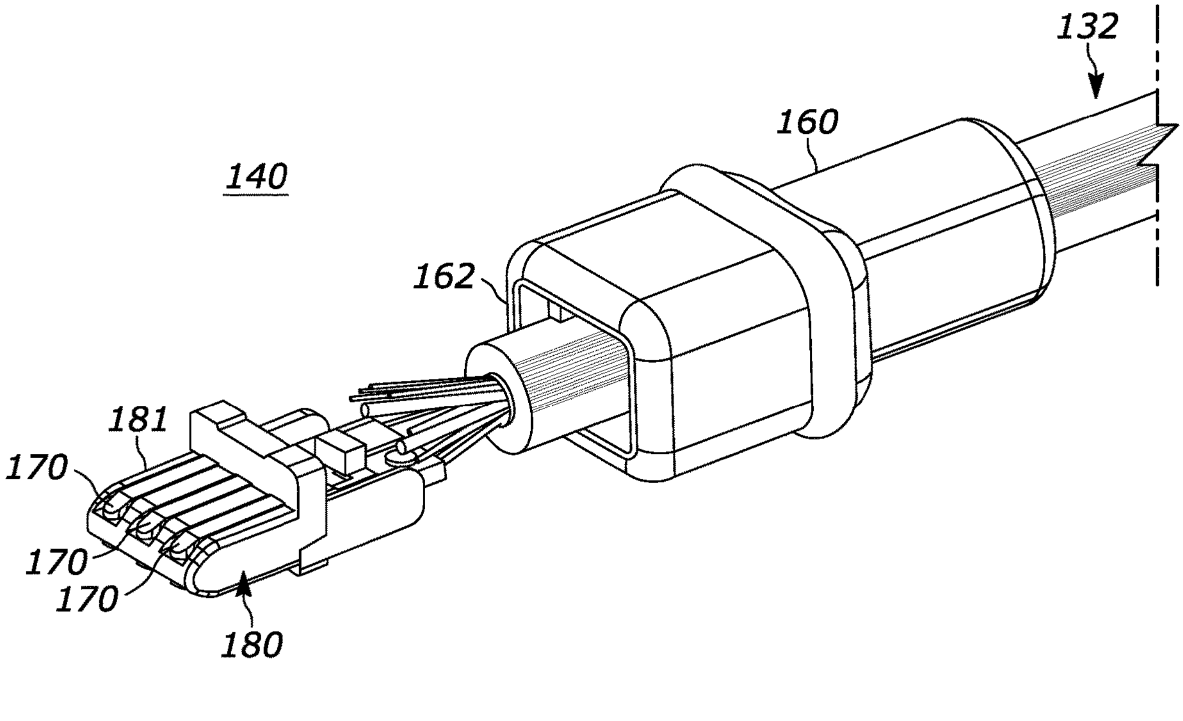
FIG. 4 is a partially assembled representative electrical cable assembly comprising an electrical connector.

In FIG. 4, the electrical connector 140 comprises a housing 160 having an open-ended cavity 162 on one end and an opening on an opposite end to accommodate the electrical cable 132. The housing can be a plastic formed in an injection molding or other material formed by some other process. The electrical cable is mechanically coupled to the housing. The electrical cable can be axially, and in some implementations rotationally, fixed to the housing with glue, epoxy, sealing adhesive or by some other known or future means after assembly with the contact carrier as described further herein.

Figure 5:
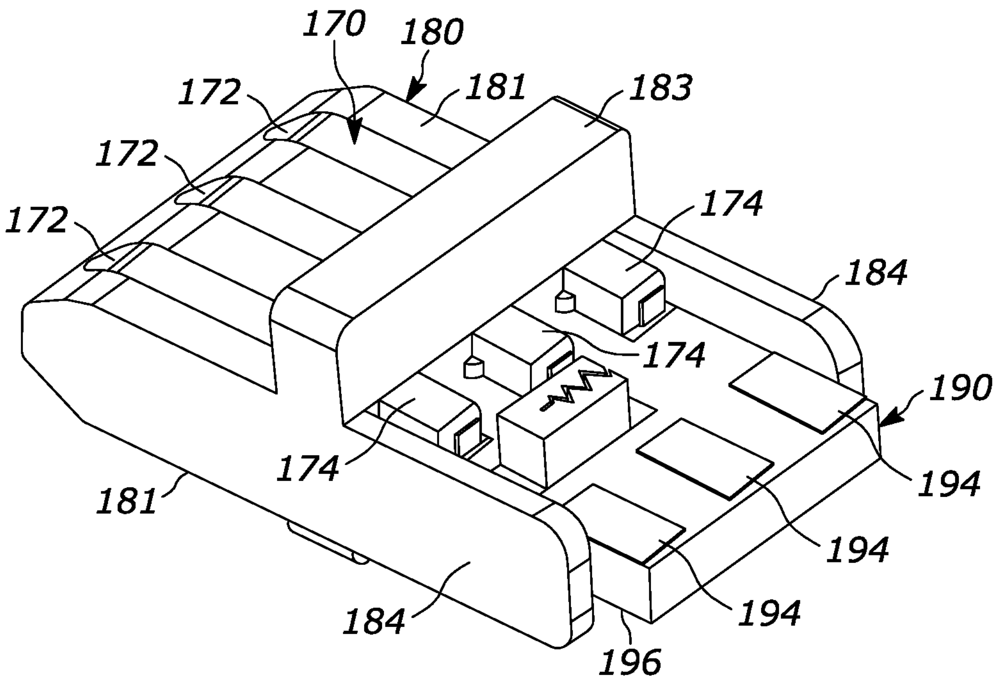
FIG. 5 is partially assembled electrical connector comprising a circuit board and connector contacts integrated with a contact carrier.
Figure 6:
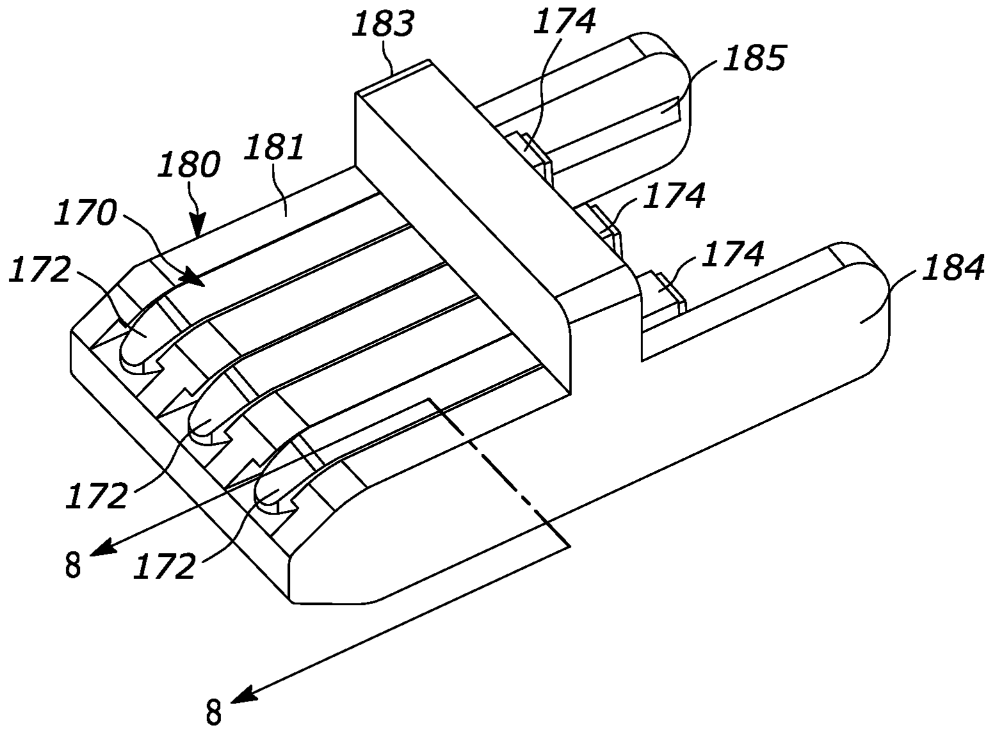
FIG. 6 is a partially assembled electrical connector comprising connector contacts integrated with a contact carrier before integration of a circuit board.

In FIGS. 3-6, multiple connector contacts 170 are integrated with the contact carrier 180 and arranged in spaced apart relation on one or more flat surfaces 181 thereof. The representative connector contacts comprise longitudinal members. In FIGS. 5-6, a first end portion 172 of each connector contact is located on the first portion of the contact carrier and a second end portion 174 of each connector contact is located on the second portion of the contact carrier. The first and second portions of the contact carrier 180 are separated by a wall portion 183. In other implementations, the connector contacts can assume different shapes and be located on a non-flat surface, for example, a cylindrical surface of the conductor carrier.

Generally, the connector contacts can be formed on, embedded in, or otherwise fastened to, the contact carrier so that a surface of the connector contact is exposed for contact with a spring or other contact of the base unit when coupled thereto. In one implementation, each connector contact is at least partially disposed in a corresponding slot of the contact carrier. Each slot and corresponding connector contact can comprise complementary structures retaining the connector contact in the corresponding slot. Alternatively, the connector contacts can be integrated with the contact carrier in an insert injection molding operation.

Figure 7:
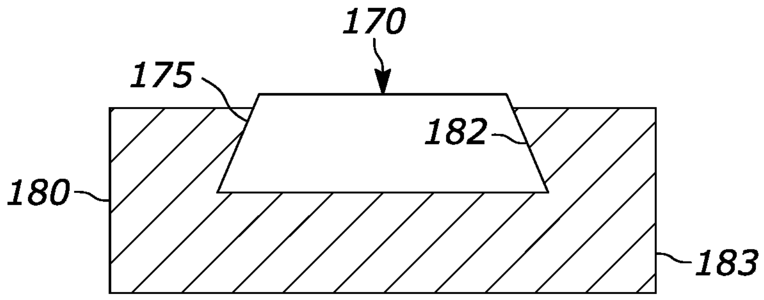
FIG. 7 is a partial sectional view of FIG. 6 showing a connector contact disposed in a complementary slot of a contact carrier.
Figure 8:
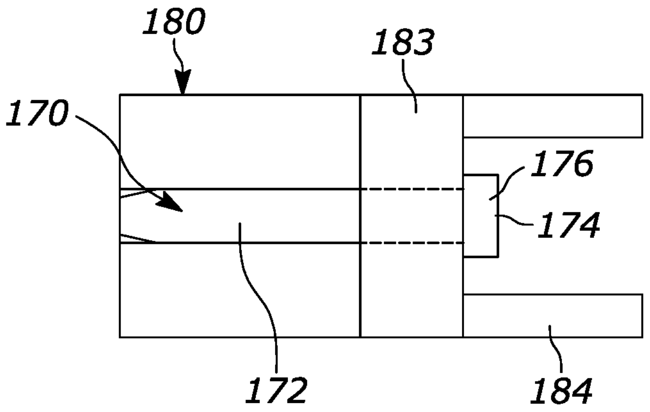
FIG. 8 is a plan view of a connector contact comprising a flange limiting insertion into a slot of the contact carrier.

In FIG. 7, the connector contact 170 has a dovetail sectional shape 175 that fits into a dovetail slot 182 of the contact carrier 180. In another implementation, the connector contacts can have longitudinal flanges that extend laterally into recesses that run along the slots. The connector contacts can be assembled with the contact carrier by sliding into the corresponding slots from either end of the contact carrier. In FIG. 8, the connector contact 170 has one or more flanges 176 that abut a portion of the contact carrier to limit slidable insertion of the connector contact into the slot of carrier 180 from the second portion of the contact carrier.

The electrical connector also comprises a circuit board integrated with the contact carrier. The second end portion of each connector contact is connected to a corresponding one of a plurality of circuit board contacts located proximate the second end portions of the connector contacts as described further herein. The circuit board can be supported by the second portion of the contact carrier and is located in the cavity of the housing when the contact carrier is assembled with the housing. In FIG. 5, the circuit board 190 is located between the second end portions 174 of the connector contacts by arms 184 of the contact carrier 180. In FIG. 6, the arms 184 include optional slots 185 into which lateral edges of the circuit board are located. The arms can be flexed apart to capture the circuit board in the slots. Alternatively, the slots can extend through the end of the arms 184 so the circuit board can be slidably assembled with the contact carrier without flexing the arms. The slots support the circuit board 190 and ensure proper alignment of the circuit board contacts with the corresponding second end portions 174 of the connector contacts. Alternatively, the circuit board can be supported and aligned with the connector contacts by an underlying shelf or other structure of the contact carrier. Alternatively, the circuit board can be supported by only the connector contacts. Such support and alignment structure can be used alone or in combination with the support arms. The circuit board can be fastened to the contact carrier by adhesive, friction fit or interlocking structure prior to electrically connecting the connector contacts to circuit board contacts, as described further herein.

A first end portion of the electrical cable is mechanically coupled to the electrical connector and a first end portion of each wire is electrically connected to a corresponding one of the multiple connector contacts via the circuit board. The circuit board can also comprise a second plurality of circuit board contacts, wherein the first end portion of each wire is connected to a corresponding one of the second plurality of circuit board contacts. Each one of the second plurality of circuit board contacts, to which a wire of the electrical cable is connected, is coupled to a corresponding one of the first plurality of circuit board contacts by an electrical trace of the circuit board. Alternatively, the first plurality of circuit board contacts can extend across the surface of the circuit board and each wire can be electrically coupled directly to a corresponding one of the first plurality of circuit board contacts, eliminating the need for the second plurality of printed circuit board contacts and circuit board traces interconnecting the first and second circuit board contacts. In some implementations, one or more of the connector contacts is not connected to any wires of the electrical cable.

Figure 10:
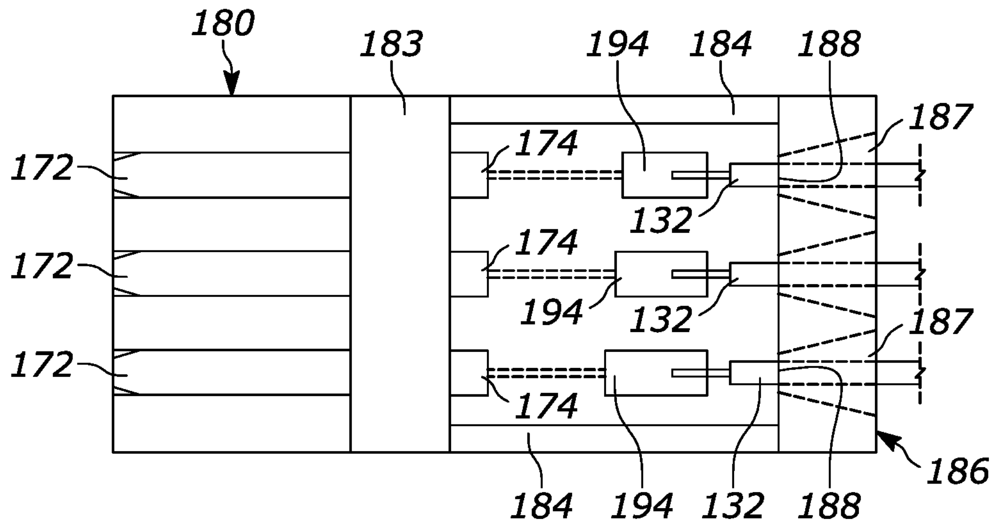
FIG. 10 is a plan view of a circuit board comprising an electrical component interconnecting contacts of the circuit board.

In FIGS. 5 and 10, the circuit board 190 comprises a first plurality of circuit board contacts 192. In FIG. 5, each of the first plurality of circuit board contacts is electrically connected to the second end portion of a corresponding connector contact 170. In FIG. 5, the circuit board 190 comprises a second plurality of circuit board contacts 194. The second plurality of circuit board contacts 194 are electrically coupled to a corresponding one of the first plurality of circuit board contacts 192 by a corresponding trace on or embedded in the circuit board. In FIG. 4, the first end portion of each wire is electrically coupled to a corresponding one of the second plurality of circuit board contacts. The wires can be electrically connected to the contacts by soldering, conductive past or other known or future process. The electrical connection between the connector contacts and the circuit can also retain, or help retain, the circuit board and connector contacts to the contact carrier. More generally, contacts can be located on opposite sides of the circuit board for connection with connector contacts on an opposite surface of the contact carrier.

Figure 9:
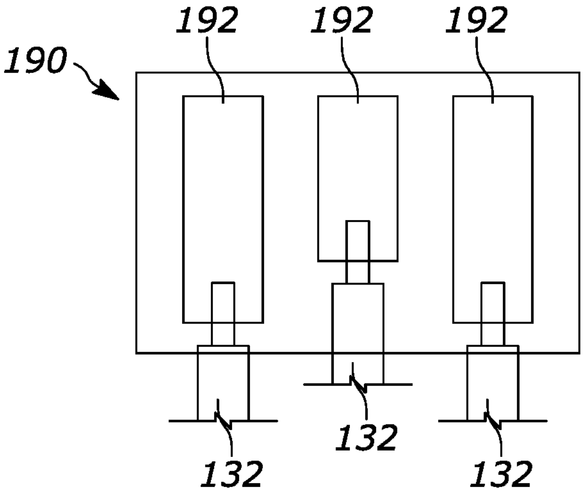
FIG. 9 is a partial view of a circuit board comprising contacts arranged in an arc.

In one implementation, the circuit board optionally comprises a plurality of contacts arranged in an arc. According to this implementation, the first end portions of the multiple wires have different lengths and each wire is connected to a corresponding one of the contacts arranged in an arc, wherein each circuit board contact to which a wire is connected is connected to a corresponding connector contact. The arcuate contacts can correspond to the second plurality of circuit board contacts. Alternatively, the arcuate contacts can correspond to the first plurality of circuit board contacts in implementations without the second plurality of circuit board contacts. In FIG. 9, the circuit board contacts 196 are arranged in an arc on a surface of the circuit board and the first end portions 132 of the multiple wires connected to the contacts have different lengths. The arcuate arrangement of the contacts and different length wires eases connecting the wires to the circuit board contacts and reduces assembly error.

In some implementations, the electrical connector optionally comprises a wire-guide having multiple tapered tunnels, each tapered tunnel having a wide inlet and a narrow outlet located proximate the circuit board, wherein each wire of the electrical cable extends through a corresponding tapered tunnel. The wire-guide can be integrated with the contact carrier or some other part of the connector. In FIG. 10, the contact carrier 180 comprises a wire-guide 186 having multiple tapered tunnels. Each tapered tunnel having a wide inlet 187 and a narrow outlet 188 located proximate a corresponding circuit board contact 194. Each wire of the electrical cable extends through a corresponding tapered tunnel and the end portion 132 of the wire is electrically connected to a corresponding circuit board contact 194. The wire-guide eases alignment and assembly of the wires with the corresponding conductor pads and reduces assembly error. The wire-guide can be used alone or in combination with the arcuate conductor pad arrangement.

The circuit board can comprise one or more electrical circuit elements connected to one or more connector contacts via conductors of the circuit board. The circuit element can be a resistor, capacitor, inductor, active circuit element, circuit breaker, integrated circuit or a combination thereof. For example, one or more circuit elements can be configured as a filter or other more complex circuit. The circuit elements can be surface mounted, printed on, or embedded in the circuit board.

Figure 11:
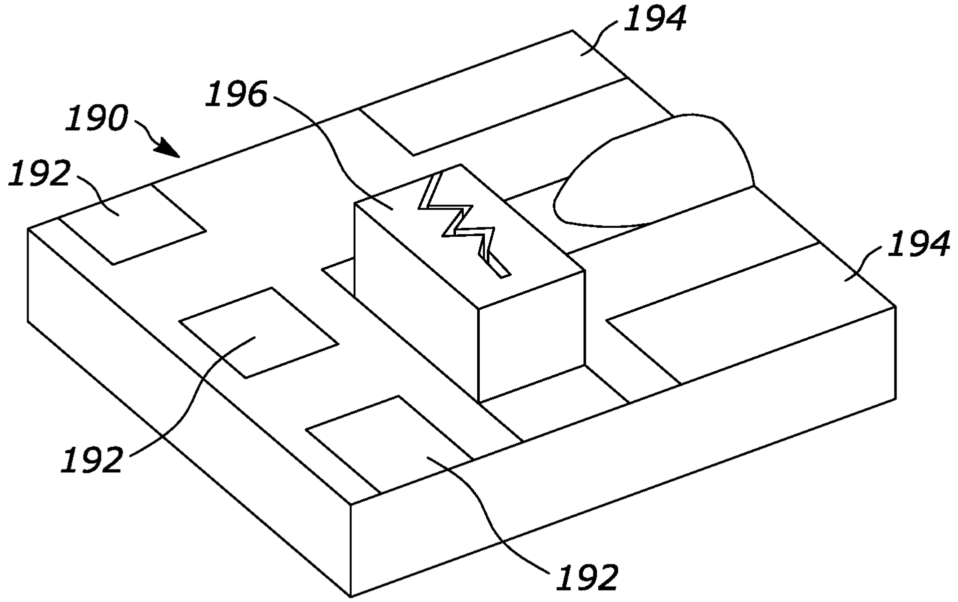
FIG. 11 is a perspective view of a circuit board comprising a resistor interconnecting contacts of the circuit board.

In one implementation, the circuit board comprises a resistor or other circuit element electrically connecting two of the connector contacts, wherein at least one of the two connector contacts is not coupled to a wire of the electrical cable. In one implementation, one of the two connector contacts connected to the circuit element is connected to ground and the other connector contact is connected not connected to any wire of the cable assembly. In FIG. 11, the circuit board 190 comprises a resistor 196 connecting two of the plurality of circuit board contacts 192 by electrical traces (not shown) connected to contacts to which the resistor is connected, thereby connecting connector contacts. The resistor can have a resistance value selected to indicate a characteristic of the RIC unit or electrical cable assembly. Such characteristic can be electrical cable size, power, functional features, etc. or a combination thereof. Thus configured, the base unit can determine the type or characteristic of the in-ear unit or the cable assembly based on detection of the resistor, or some other circuit element. In one implementation, one or both of the connector contacts coupled to the circuit element are not connected to corresponding wires of the electrical cable.

The second portion of the contact carrier extends into the cavity and a wall portion of the contact carrier covers an open-end of the cavity. The second end of the contact carrier and the housing cavity have complementary shapes to properly orient and align the first portion of the contact carrier and the connector contacts thereon relative to the housing. FIG. 4 shows an unassembled contact carrier 180 supporting a circuit board 190 connected to wires of an electrical cable 132 before the contact carrier is assembled with the housing 160. The wall portion and the lateral arms accurately orient and align the contact carrier within the housing cavity during assembly. In some implementations, an adhesive is disposed in the cavity of the housing before or after assembly. The adhesive fixes the contact carrier to the housing, fixes the electrical cable to the housing, and prevents moisture and debris from entering the cavity. In one implementation, the adhesive is injected into the cavity after the contact carrier is assembled with the housing. The adhesive can be injected via an injection hole to the cavity. A vent from the cavity can expel air from the cavity as the adhesive is injected. FIG. 3 shows the adhesive injection hole and the vent in the housing. The injection hole and vent can also be located in the wall portion of the contact carrier.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is claimed is:

1. An ear-worn hearing device component comprising:

an electrical connector comprising a housing and multiple connector contacts integrated with a contact carrier, a first portion of the contact carrier and a first end portion of each connector contact protruding from the housing, a second portion of the contact carrier and a second end portion of each connector contact disposed in a cavity of the housing, the contact carrier covering an open-end of the cavity and orienting the first portion of the contact carrier relative to the housing, a circuit board located in the cavity of the housing, the second end portion of each connector contact connected to a corresponding one of a plurality of circuit board contacts located proximate the second end portions of the connector contacts;

an electrical cable comprising multiple wires, a first end portion of the electrical cable mechanically coupled to the electrical connector, and a first end portion of each wire electrically connected to a corresponding one of the multiple connector contacts via the circuit board.

2. The ear-worn hearing device component of claim 1, the contact carrier comprising arms between which the circuit board is located, and a wall portion covering the open-end of the cavity of the housing.

3. The ear-worn hearing device component of claim 1, at least one connector contact not coupled to a wire of the electrical cable.

4. The ear-worn hearing device component of claim 1, the circuit board comprising a resistor electrically connecting two of the connector contacts, at least one of the two connector contacts not coupled to a wire of the electrical cable.

5. The ear-worn hearing device component of claim 1, the circuit board comprising a circuit element electrically connected to at least one connector contact via a conductor of the circuit board.

6. The ear-worn hearing device component of claim 1, each connector contact disposed in a corresponding slot of the contact carrier, each slot and corresponding connector contact comprising complementary structures retaining the connector contact in the corresponding slot.

7. The ear-worn hearing device component of claim 1, each connector contact comprising a longitudinal member disposed in a corresponding slot of the contact carrier, the second end portion of each connector contact comprising a flange abutting a portion of the contact carrier, wherein the flange limits slidable insertion of the connector contact into the corresponding slot of the contact carrier.

8. The ear-worn hearing device component of claim 1, the circuit board comprising a second plurality of circuit board contacts, the first end portion of each wire connected to a corresponding one of the second plurality of circuit board contacts, each contact of the second plurality of circuit board contacts, to which a wire of the electrical cable is connected, coupled to a corresponding one of the first plurality of circuit board contacts.

9. The ear-worn hearing device component of claim 1, the circuit board comprising a plurality of contacts arranged in an arc, the first end portion of each of the multiple wires having a different length and connected to a corresponding one of the contacts arranged in an arc.

10. The ear-worn hearing device component of claim 9, the contact carrier comprising a wire-guide having multiple tapered tunnels, each tapered tunnel having a wide inlet and a narrow outlet located proximate the circuit board, each wire of the electrical cable extending through a corresponding tapered tunnel.

11. The ear-worn hearing device component of claim 1 further comprising an adhesive disposed in the cavity of the housing, an adhesive injection hole to the cavity, and a vent from the cavity.

12. The ear-worn hearing device component of claim 1 in combination with an acoustic receiver having a sound port, a second end portion of the electrical cable electrically and mechanically coupled to the acoustic receiver.

13. The ear-worn hearing device component of claim 12 in combination with a base unit comprising a complementary connector, wherein the electrical connector is mechanically and electrically coupled to the complementary connector of the base unit.

14. An ear-worn hearing device component comprising:

an electrical connector comprising a housing and multiple connector contacts integrated with a contact carrier, a first portion of the contact carrier and a first end portion of each connector contact protruding from the housing, a second portion of the contact carrier and a second end portion of each connector contact disposed in a cavity of the housing, the contact carrier covering an open-end of the cavity and orienting the first portion of the contact carrier relative to the housing, a circuit board located in the cavity of the housing, the second end portion of each connector contact connected to a corresponding one of a first plurality of circuit board contacts located proximate the second end portions of the connector contacts;

a wire-guide having multiple tapered tunnels, each tapered tunnel having a wide wire inlet and a narrow wire outlet located proximate the circuit board;

an electrical cable comprising multiple wires, a first end portion of the electrical cable mechanically coupled to the electrical connector, each wire extending through a corresponding tapered tunnel, and a first end portion of each wire electrically coupled to a corresponding one of the multiple connector contacts via the circuit board.

15. The ear-worn hearing device component of claim 14, the circuit board comprising a resistor electrically connecting two of the connector contacts, at least one of the two connector contacts not coupled to a wire of the electrical cable.

16. The ear-worn hearing device component of claim 15, the circuit board comprising a second plurality of circuit board contacts, the first end portion of each wire connected to a corresponding one of the second plurality of circuit board contacts, each of the second plurality of circuit board contacts, to which a wire of the electrical cable is connected, is coupled to a corresponding one of the first plurality of circuit board contacts.

17. The ear-worn hearing device component of claim 14, the circuit board comprising a plurality of circuit board contacts arranged in an arc, the first end portion of each of the multiple wires having different lengths and connected to a corresponding one of the circuit board contacts arranged in an arc, wherein each circuit board contact arranged in an arc, and to which a wire is connected, is connected to a corresponding connector contact.

18. The ear-worn hearing device component of claim 14, wherein the wire-guide is part of the conductor carrier.

19. The ear-worn hearing device component of claim 14 in combination with an acoustic receiver having a sound port, a second end portion of the electrical cable electrically and mechanically coupled to the acoustic receiver.

20. The ear-worn hearing device component of claim 19 in combination with a base unit comprising a complementary connector, wherein the electrical connector is mechanically and electrically coupled to the complementary connector of the base unit.

* * * * *